US009432801B2

(12) United States Patent
Chen et al.

(10) Patent No.: US 9,432,801 B2
(45) Date of Patent: Aug. 30, 2016

(54) LOCATION-BASED SERVICE SYSTEM AND SERVING METHOD

(75) Inventors: Yu-Jia Chen, Hsinchu (TW); Li-Chun Wang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1227 days.

(21) Appl. No.: 13/402,206

(22) Filed: Feb. 22, 2012

(65) Prior Publication Data

US 2013/0122863 A1    May 16, 2013

(30) Foreign Application Priority Data

Nov. 16, 2011 (TW) .............................. 100141767 A

(51) Int. Cl.
| | | |
|---|---|---|
| H04M 11/00 | (2006.01) | |
| H04M 3/42 | (2006.01) | |
| H04W 4/00 | (2009.01) | |
| H04W 24/00 | (2009.01) | |
| H04W 4/02 | (2009.01) | |
| H04W 12/06 | (2009.01) | |

(52) U.S. Cl.
CPC .............. *H04W 4/02* (2013.01); *H04W 12/06* (2013.01)

(58) Field of Classification Search
CPC ..... H04W 60/00; H04W 8/04; H04W 12/06; H04L 29/08936; H04L 29/08657
USPC .......... 455/404.2, 414.2, 435.1, 456.3, 456.5
See application file for complete search history.

(56) References Cited

U.S. PATENT DOCUMENTS

| | | | | |
|---|---|---|---|---|
| 2005/0096048 | A1* | 5/2005 | Clare | H04W 12/06 455/433 |
| 2005/0198517 | A1* | 9/2005 | Ivanov | G06F 21/125 713/187 |
| 2008/0207168 | A1* | 8/2008 | Forsberg | H04L 63/08 455/411 |
| 2012/0131144 | A1* | 5/2012 | Cooper | G06F 9/5055 709/219 |
| 2012/0240195 | A1* | 9/2012 | Weiss | H04L 63/0846 726/4 |
| 2012/0254960 | A1* | 10/2012 | Lortz | H04L 63/104 726/7 |
| 2012/0324581 | A1* | 12/2012 | Economos, Jr. | H04W 12/08 726/25 |

OTHER PUBLICATIONS

Chen et al., "A Security Framework of Group Location-Based Mobile Applications in Cloud Computing", Institute of Communications Engineering, National Chiao Tung University, pp. 1-7 (Published Sep. 13, 2011).

* cited by examiner

*Primary Examiner* — Joshua Schwartz
(74) *Attorney, Agent, or Firm* — Mintz Levin Cohn Ferris Glovsky and Popeo, P.C.; Peter F. Corless; Steven M. Jensen

(57) ABSTRACT

A location-based service system and method, which allows a location-based service server connected with a communication device and a cloud data server to perform registration authorization procedures and service authorization procedures using an international mobile subscriber identity of the communication device that cannot be easily modified or forged in the registration and service modes, so that a user may obtain a specific location-based service result via the communication device, and this distributed authentication technique reduces the risk of data theft while increasing the flexibility and convenience in obtaining services.

4 Claims, 2 Drawing Sheets

LOCATION-BASED SERVICE SYSTEM AND SERVING METHOD

CROSS-REFERENCES TO RELATED APPLICATIONS

This application claims under 35 U.S.C. §119(a) the benefit of Taiwanese Application No. 100141767, filed Nov. 16, 2011, the entire contents of which is incorporated herein by reference.

FIELD OF THE INVENTION

The present invention relates to location-based service systems and methods, and, more particularly, to a location-based service system and method for distributed authentication using international mobile subscriber identities of communication devices.

BACKGROUND OF THE INVENTION

With the widespread of network apparatuses, most telecommunication service providers offer location-based services equipped with a Global Positioning System (GPS) and an Assisted Global Positioning System (AGPS), so that communication devices are able to obtain a wide range of services via network.

For example, a location-based service may allow a user to search for events happening around his/her location using a mobile phone (a communication device), thereby increasing consumer options in areas such as food, clothing, housing, transportation, education, entertainment and etc. However, in the process of using the location-based service, illegal parties may obtain the location information of the user by exploiting system vulnerabilities, or other individual subscriber information stored in a cloud server, this will violate individual privacy. Even with the advent of "Amazon EC2" system or "SQL Azure" system, this shortcoming is still not eliminated.

Therefore, there is an urgent need to eliminate information leakage in existing location-based services.

SUMMARY OF THE INVENTION

In the light of forgoing drawbacks, an objective of the present invention is to provide a location-based service technique that reduces data leakage.

In accordance with the above and other objectives, the present invention provides a location-based service system for providing a location-based service result to a communication device connected thereto, the system comprising: a location-based service server for receiving a first account information and a first service authentication code transmitted by the communication device in a registration mode, the location-based service server including a user repository and an authentication module, wherein the authentication module authenticates the received first service authentication code, and upon authentication, stores the received first account information in the user repository, and generates a first cloud authentication code based on the received first service authentication code; and a cloud data server comprising a communication device repository for receiving the first cloud authentication code and storing the first cloud authentication code in the communication device repository, wherein the location-based service server receives a second account information and a second service authentication code transmitted by the communication device in a service mode, so as to make the authentication module authenticate the second account information based on the first account information stored in the user repository, and upon authentication, the authentication module generates a second cloud authentication code based on the received second service authentication code, and authenticates the second cloud authentication code based on the first cloud authentication code stored in the communication device repository, such that the location-based service server provides a specific location-based service result to the communication device.

The present invention further provides a location-based service method for allowing a communication device to connect with a location-based service and a cloud data server to obtain a specific location-based service result, the method comprising the following steps: having the location-based service server receive a first account information and a first service authentication code transmitted by the communication device in a registration mode; having the location-based service server authenticate the received first service authentication code, and upon authentication, store the first account information; having the location-based service server generate a first cloud authentication code based on the received first service authentication code, and store the first cloud authentication code in the cloud data server; having the location-based service server receive a second account information and a second service authentication code transmitted by the communication device in a service mode; having the location-based service server authenticate the received second account information based on the stored first account information, and upon authentication, generate the second cloud authentication code based on the received second service authentication code; and having the location-based service server authenticate the second cloud authentication code based on the first cloud authentication code stored in the cloud data server, and upon authentication, having the location-based service server provide a specific location-based service result to the communication device.

In an embodiment, the communication device performs a secure hash algorithm on an international mobile subscriber identity of the communication device to generate the first and the second service authentication codes, and the authentication module performs a secure hash algorithm on the first and the second service authentication codes to generate the first and the second cloud authentication codes.

Compared with the prior art, the present invention allows the communication device to generate the first and second service authentication codes applicable to the location-based service server using the international mobile subscriber identity of the communication device that cannot be easily modified or forged in the registration and service modes, and further allows the location-based service server to generate the first and second cloud authentication codes applicable to the cloud data server using the first and second service authentication codes. As a result, the location-based service server and the cloud data server may complete the predetermined registration authorization procedures and service authorization procedures, which not only reduces the risk of data theft, but also increases the flexibility and convenience in obtaining services.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
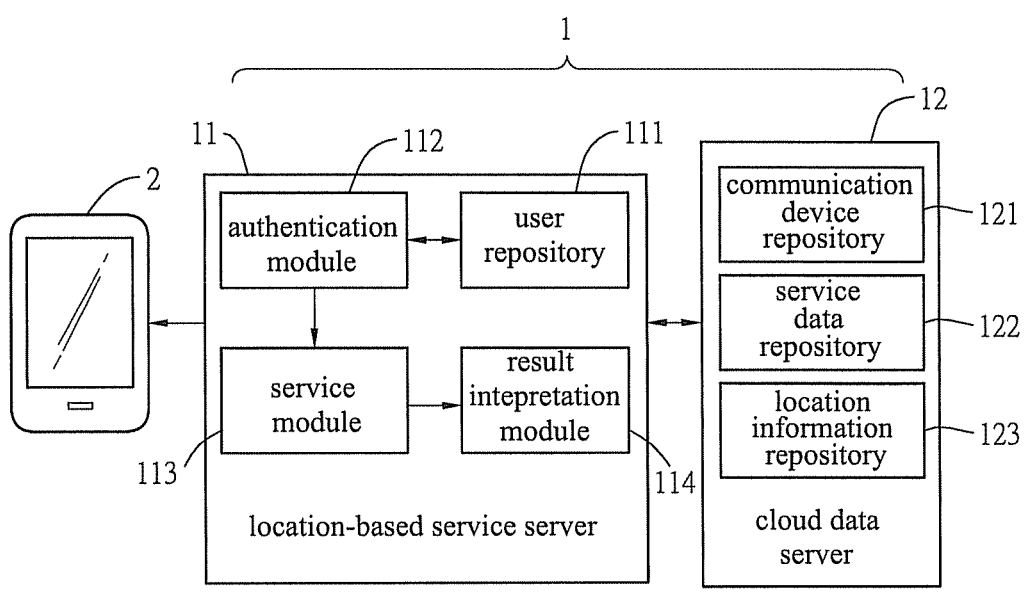
FIG. 1 is a schematic diagram depicting a location-based service system according to an embodiment of the present invention.

Referring to FIG. 1, a schematic diagram depicting a location-based service system 1 according to the present invention is shown. As shown in the diagram, the location-based service system 1 provides location-based services to a communication device 2 connected thereto. The location-based service system 1 includes a location-based service server 11 and a cloud data server 12. The location-based service server 11 includes a user repository 111 and an authentication module 112. The cloud data server 12 includes a communication device repository 121. In this embodiment, the location-based service server 11 may further include a service module 113 and a result interpretation module 114. The cloud data server 12 may also include a service data repository 122 and a location information repository 123.

The location-based service server 11 receives a first account information and a first service authentication code transmitted by the communication device 2 in a registration mode. The authentication module 112 authenticates the received first service authentication code, and upon authenticating the first service authentication code, stores the received first account information in the user repository 111, and further produces a first cloud authentication code based on the received first service authentication code. In this embodiment, the communication device 2 may perform a secure hash algorithm on an international mobile subscriber identity of the communication device to generate the first service authentication code. This international mobile subscriber identity cannot be easily modified or forged. The first account information is inputted by the user via the communication device 2 during the registration mode.

The cloud data server 12 includes the communication device repository 121 for receiving and storing the first cloud authentication code generated by the authentication module 112. The location-based service server 11 further receives a second account information and a second service authentication code transmitted by the communication device 2 in a service mode. The authentication module 112 then authenticates the received second account information based on the first account information stored in the user repository 111, and the authentication module 112 further generates a second cloud authentication code based on the received second service authentication code in order to authenticate the second cloud authentication code based on the first cloud authentication code stored in the communication device repository 121. Upon authentication, the location-based service server 11 provides a specific location-based service result to the communication device 2.

In this embodiment, the communication device 2 may also perform a secure hash algorithm on the international mobile subscriber identity of the communication device that cannot be easily modified or forged to generate the second service authentication code, and the second account information can also be inputted by the user via the communication device 2 during application service mode.

More specifically, authenticating the received first service authentication code by the authentication module 112 involves analyzing the received first service authentication code to obtain a corresponding mobile country code and a mobile network code, and then connecting to an external mobile communication operation server of the telecommunication service provider to compare the mobile country code and the mobile network code. Furthermore, the authentication module 112 may further perform a secure hash algorithm on the first and second service authentication codes to produce the first and second cloud authentication codes.

Moreover, the location-based service server 11 also includes the service module 113 and result interpretation module 114. The cloud data server 12 includes the service data repository 122 and location information repository 123. In this embodiment, after the second cloud authentication code is authenticated using the first cloud authentication code stored in the communication device repository 121, the service module 113 obtains real-time location information from the communication device 2 so as to provide an original service result from the service data repository 122 to the result interpretation module 114. The result interpretation module 114 adjusts the original service result based on a privacy setting transmitted by the communication device 2 to produce a location-based service result corresponding to the location information, and return the generated location-based service result to the communication device 2. The location-based service server 11 further processes the received location information by using the privacy setting of the communication device 2, and stores the location information in the location information repository 123 using the first or second service authentication code as an identifier.

Figure 2:
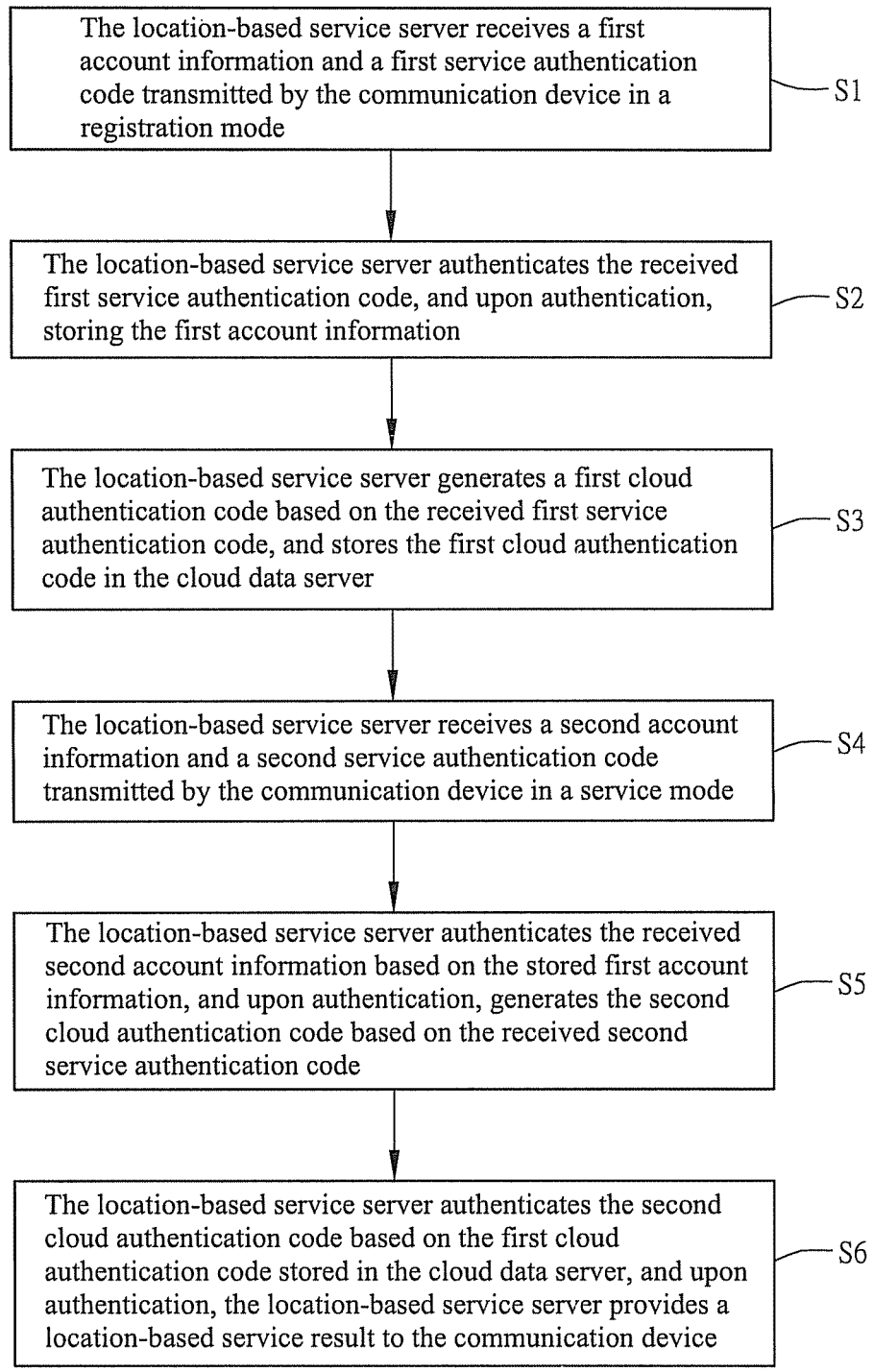
FIG. 2 is a flowchart illustrating a location-based service method according to an embodiment of the present invention.

The location-based service method according to the present invention can be understood by referring to FIG. 2 and the foregoing descriptions.

In step S1, a registration mode is initiated, so as for the location-based service server 11 to receive a first account information and a first service authentication code transmitted by the communication device 2, then proceeds to step S2. In this embodiment, step S1 further includes a step of performing a secure hash algorithm on an international mobile subscriber identity of the communication device 2 by the communication device 2 to generate the first service authentication code, and receiving the first account information inputted by a user via the communication device 2.

In step S2, the location-based service server 11 authenticates the received first service authentication code, and upon authentication, stores the received first account information, then proceeds to step S3. In this embodiment, the location-based service server 11 analyzes the first service authentication code to obtain a corresponding mobile country code and a mobile network code, and connects to an external mobile communication operation server to determine whether the mobile country code and the mobile network code are legitimate, thereby completing the authentication procedures of the first service authentication code.

In step S3, the location-based service server 11 generates a first cloud authentication code based on the received first service authentication code and stores the first cloud authentication code in the cloud data server 12, then proceeds to step S4. In this embodiment, the location-based service performs a secure hash algorithm on the first service authentication code to generate the first cloud authentication code.

In step S4, a service mode is initiated, so as for the location-based service server 11 to receive a second account information and a second service authentication code transmitted by the communication device 2, then proceeds to step S5. In this embodiment, step S4 further includes a step of performing a secure hash algorithm on the international mobile subscriber identity of the communication device 2 by the communication device 2 to generate the second service authentication code, and receiving the second account information inputted by the user via the communication device 2.

In step S5, the location-based service server 11 authenticates the second account information received in step S4 based on the first account information stored in step S2, and upon authentication, generates a second cloud authentication code based on the received second service authentication code, then proceeds to step S6. In this embodiment, the location-based service server 11 may perform a secure hash algorithm on the second service authentication code to generate the second cloud authentication code.

In step S6, the location-based service server 11 authenticates the second cloud authentication code generated in step S5 based on the first cloud authentication code stored in the cloud data server 12 in step S3. Upon authentication, the location-based service server 11 provides a location-based service result to the communication device 2.

In this embodiment, the step S6 of providing a location-based service result via the location-based service server 11 to the communication device 2 can be further divided into the following steps. First, the location-based service server 11 obtains location information of the communication device 2 in order to obtain an original service result from the data of the cloud data server 12. Then, the location-based service server 11 adjusts the original service result based on a privacy setting transmitted by the communication device 2 to generate a location-based service result. Finally, the location-based service server 11 provides the generated location-based service result to the communication device 2. Then, after step S6 is completed, the location-based service server 11 may further process the received location information based on the privacy setting transmitted by the communication device 2, and store the processed location information in the cloud data server 12 using the first or second service authentication code as an identifier.

It should be noted that in the registration mode, if the authentication of the mobile country code or the mobile network code, or the authentication performed by the connected external mobile communication operation server fails, the method is returned to step S1 in which the location-based service server 11 receives the first account information and the first service authentication code transmitted by the communication device 2. In the service mode, if the authentication of the second account information or the second cloud authentication code fails, the method may return to step S4 to receive the second account information and the second service authentication code from the communication device 2.

In summary, the present invention allows the communication device to generate the first and second service authentication codes applicable to the location-based service server using the international mobile subscriber identity of the communication device that cannot be easily modified or forged in the registration and service modes, and further allows the location-based service server to generate the first and second cloud authentication codes applicable to the cloud data server using the first and second service authentication codes. As a result, the location-based service server and the cloud data server may complete the registration authorization procedures and the service authorization procedures that reduce the risk of data theft while increasing the flexibility and convenience in obtaining services.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A location-based service system for providing a location-based service result to a communication device connected thereto, the system comprising:
   a location-based service server for receiving a first account information and a first service authentication code transmitted by the communication device in a registration mode, the location-based service server comprising a user repository location-based service server authenticates the received first service authentication code, and upon authentication, stores the received first account information in the user repository, and generates a first cloud authentication code based on the received first service authentication code; and a cloud data server comprising a communication device repository for receiving the first cloud authentication code and storing the first cloud authentication code in the communication device repository, wherein the location-based service server receives a second account information and a second service authentication code transmitted by the communication device in a service mode, so as to make the location-based service server authenticate the second account information based on the first account information stored in the user repository, and upon authentication, the location-based service server generates a second cloud authentication code based on the received second service authentication code, and authenticates the second cloud authentication code based on the first cloud authentication code stored in the communication device repository, such that the location-based service server provides a specific location-based service result to the communication device.

2. The location-based service system of claim 1, wherein and the cloud data server further comprises a service data repository and a location information repository; wherein the location-based service server obtains location information from the communication device after the authentication of the second cloud authentication code is completed in order to obtain an original service result based on data in the service data repository the location-based service server adjusts the original service result based on a privacy setting transmitted by the communication device to generate the location-based service result and transmits the location-based service result to the communication device, and the location-based service server processes the location information based on the privacy setting transmitted by the communication device to store the processed location information in the location data repository using the first or the second service authentication code as an identifier.

3. The location-based service system of claim 1, wherein the communication device performs a secure hash algorithm on an international mobile subscriber identity of the communication device to generate the first and the second service authentication codes, and the first and the second account information are inputted by a user via the communication device.

4. The location-based service system of claim 1, wherein authenticating the received first service authentication code by the location-based service server includes analyzing the first service authentication code to obtain a mobile country code and a mobile network code, and connecting to an external mobile communication operation server to compare the mobile country code and the mobile network code, and the location-based service server performs a secure hash algorithm on the first service authentication code and the second service authentication code to generate the first cloud authentication code and the second cloud authentication code, respectively.

* * * * *